United States Patent [19]
Ward

[11] Patent Number: 5,661,529
[45] Date of Patent: Aug. 26, 1997

[54] MEASUREMENT OF NOISE IMPAIRMENTS OF TV SIGNALS

[75] Inventor: Rabab K. Ward, Vancouver, Canada

[73] Assignee: The University of British Columbia, Vancouver, Canada

[21] Appl. No.: 485,760

[22] Filed: Jun. 7, 1995

[51] Int. Cl.[6] .................................................. H04N 5/21
[52] U.S. Cl. ............................................ 348/607; 348/180
[58] Field of Search .................................. 348/607, 608, 348/612, 624, 909, 180, 192, 193; 358/167, 36, 139, 10; 455/296; 375/227; H04N 5/21, 5/213, 17/02, 17/00

[56] References Cited

U.S. PATENT DOCUMENTS

| | | |
|---|---|---|
| 3,729,681 | 4/1973 | Elder . |
| 4,022,989 | 5/1977 | Hoppough . |
| 4,855,827 | 8/1989 | Best . |
| 5,221,967 | 6/1993 | Ward et al. ............................. 348/180 |
| 5,323,239 | 6/1994 | Ward et al. ............................. 348/607 |
| 5,329,311 | 7/1994 | Ward et al. ............................. 348/180 |

*Primary Examiner*—Sherrie Hsia
*Attorney, Agent, or Firm*—C. A. Rowley

[57] ABSTRACT

A method for determining the composite triple beat (CTB), composite second order beat (CSO) and/or SNOW noise of cable television signal is obtained by digitizing a quiet line and determining the Fourier transform of the digitized signal and measuring the energy in the frequency range corresponding to the particular impairment of being determined. Repeating this process a significant number of time to accumulate a significant number N of values for the impairment and then using the average of the accumulated intensity to define the amount of the impairment.

20 Claims, 6 Drawing Sheets

MEASUREMENT OF NOISE IMPAIRMENTS OF TV SIGNALS

FIELD OF INVENTION

The present invention relates to a system for determining the energy of an impairment by processing quiet lines transmitted in cable TV signs.

BACKGROUND OF THE INVENTION

Noise impairments such as composite triple beats (CTB), composite second order beats (CSO) and snow noise (SNOW) are found in substantially all television sights transmitted by cable.

Various methods and systems for measuring of the impairments in TV signals have been proposed, for example, U.S. Pat. No. 5,221,967 issued Jun. 22, 1993 to Ward et al. discloses a system for retching (classifying) and monitoring impairments in cable television sights by frame grabbing and producing a two dimensional Fourier transform of the frame to reveal the impairments and their type. U.S. Pat. No. 5,329,311 issued Jul. 12, 1994 to Ward et al. discloses a system for determining the SNOW noise content of a video signal by grabbing and digitizing a video frame, filtering the digitized signal and subdividing it into subimages and determining the noise signal in each subimage to determine the noise in the signal and if desired the carrier to noise ratio.

U.S. Pat. No. 5,323,239 issued Jun. 21, 1994 to Ward et al. discloses a system for correcting a cable TV signal to reduce the CTB impairments by digitizing and dividing a frame into a plurality of stripes to estimate the amount of the impairment contained in the signal and then subtract that amount from the stripe and then reassemble the stripes.

Accurate method for measuring these impairments, particularly the measurement of CTB that provides an effective means for the cable comply to detect a problem without interfering with the projected or transmitted picture would be a significant advantage. Also a system that can measure all of the different noises CTB, CSO and/or SNOW is not prodded by the above described patented systems. The above systems also require a significant amount of computing power and a system that requires relatively small amount of processing would provide an added advantage of significant value.

BRIEF DESCRIPTION OF THE INVENTION

It is an object of the present invention to provide a non-intrusive method for determining the extent of one or more noise impairments selected from the group consisting of CTB, CSO and SNOW noise.

Broadly the present invention relates to a non-intrusive method of determining signal impairments of a TV signal of a plurality of video frames containing quiet lines comprising providing a quiet line signal of one of said quite lines, processing said quiet signal to segregate at least one noise impairment selected from the group consisting of CTB, CSO and SNOW noise impairments to provide a value for said at least one of said CTB, CSO and SNOW noise impairments, repeating said grabbing and processing for a significant number X of quiet lines, said number X of quiet lines being sufficient to obtain a meaningful reading of the amount of said at least one impairment and providing said meaningful reading.

Preferably said providing said meaningful reading will include averaging said values for said at least one impairment for said X number of quiet lines.

Preferably, said selected significant number X will comprise at least 100, preferably at least 150 quiet lines for each reading.

Preferably each said quiet line signal will be digitized to provide a digitized signal of said quiet line.

Preferably said method will further include substantially removing the effect of a visual carrier frequency from said quiet line signals.

Preferably, said processing initially performs a discrete Fourier transform of said digitized signal before said processing to segregate said selected impairment.

Preferably, said at least one impairment is CTB and is determined by a summation of the energy of said significant number of process lines in the $\pm 15$ Khz range of the visual carrier frequency of said TV signal.

Preferably, said at least one impairment is CSO and is determined by a summation of the energy of said significant number of process lines in the frequency range of said TV signal where the CSO impairment is concentrated.

Preferably, said at least one impairment is CTB and is determined based on the formula $$CTB_i = \sum_{n=0}^{k} [F(n)]^2 + \sum_{n=m-1-k}^{m-k} [F(n)]^2 \qquad (1)$$

where

F(n) is the n point discrete Fourier transform of the digitized quiet line signal having m points, k is equivalent to the frequency range in which the CTB impairment is found on the Fourier transform of the digitized signal, when said discrete Fourier transform of said digitized signal is divided into 512 points per line, k will normally have any value 0, or 1, or 2, or 3, or 4, or 5, or 6.

Preferably, said at least one impairment is CSO and is determined based on the formula $$CSO_i = \sum_{n=c-l}^{c+l} [F(n)]^2 + \sum_{n=m-c-l}^{m-c+l} [F(n)]^2 \qquad (2)$$

where

F(n) is the n point discrete Fourier transform of the digitized quiet line having m points, c is the equivalent to the central frequency of the CSO impairment frequency range on the Fourier transform of the digitized signal, l is equivalent to ½ of the CSO impairment frequency range in the Fourier transform of said digitized signal, and when said discrete Fourier transform of said digitized signal is divided into 512 points per line, l may be 0, 1, 2, or 3.

Preferably, said at least one impairment is SNOW and is determined based on the formula $$SNOW_i = \sum_{n=0}^{m-1} [F(n)]^2 \qquad (3)$$

where $n \neq 0, \ldots k$, nor $c-l_i, \ldots c+l$, nor $m-c-l \ldots m-c+l$, nor $m-1-k \ldots m-1$, where F(n) is the n point in the DFT or FFT of the digitized quiet line signal having m number of points, l is equivalent to ½ the CSO impairment frequency range in the Fourier transform of the digitized signal, k is equivalent to the frequency range in which the CTB impairment is found in the Fourier transform of the digitized signal, when said Fourier transform of said digitized signal is divided into 512 points per line 1 may be 0, 1, 2, or 3.

Preferably said processing comprises filtering said quiet line signal.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
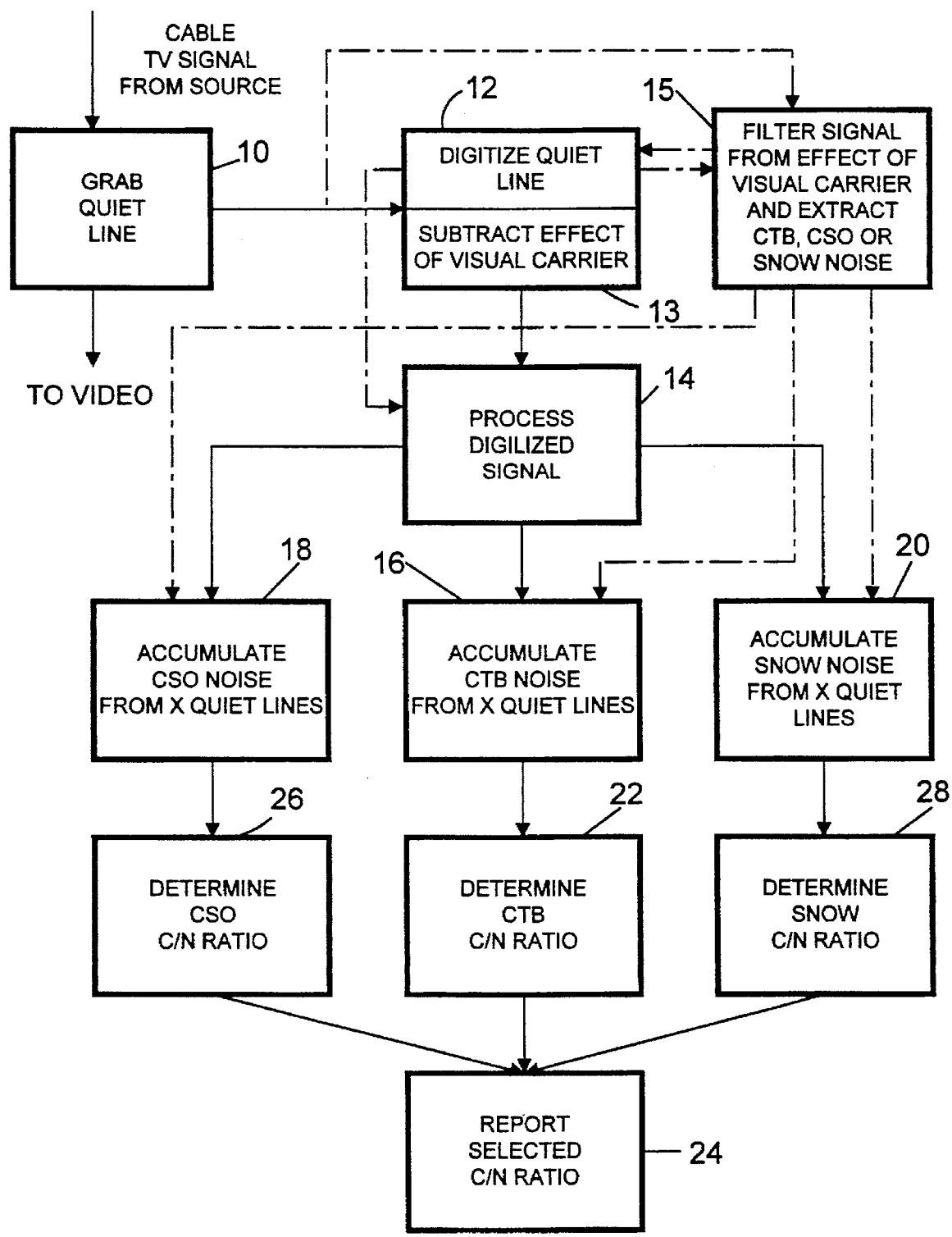
FIG. 1 is a flow diagram illustrating the method of the present invention.

As shown in FIG. 1, the TV signal is processed to grab a quiet line as indicated at 10. In a preferred system of the present invention the quiet line is then digitized as indicated at 12 and the digitized signal so produced is processed as indicated at 14. This processing step will be described in more detail hereinbelow, but in general, digitized signal is separated into components representative of the $CTB_i$ noise, $CSO_i$ noise and/or the $SNOW_i$ noise, each of which is accumulated as indicated at 16, 18 and 20 respectively for a preselected plurality X of lines.

In some cases the effect of the visual carrier is present in the quiet line and affects the noise signals being measured, if so, it is determined and subtracted from every quiet line to substantially eliminate the visual carrier effect as indicated by the box 13 prior to further processing the quiet line.

In a less preferred system the signal for the gabbed frame is not digitized, rather it is processed as indicated at 15 by selective filtering of the line signal. To obtain the CTB, CSO or SNOW noise value for each quiet line the signal for that line is passed through a filter which passes substantially only the frequencies wherein the desired impairment is found. The values for impairments so found are measured as the energy of the filtered signal.

To determine CTB, the width of this filter will preferably be ±15 Khz and its center frequency is the carrier frequency To determine CSO the width of the filter will preferably be ±15 Khz and its center frequency is the CSO center frequency.

To determine SNOW the filter system passes the frequencies not used to determines CTB and CSO.

The CTB impairment is normally determined by analyzing the signals within ±15 Khz of the visual carrier frequency, the CSO 1250±15 Khz or in some cases 2500±15 from the visual carrier and the SNOW over the full frequency range of the channel but is based on those frequencies not used to determine CTB and CSO.

The number of quiet lines X that are processed to accumulate sufficient data to define any one or more of the noises or impairments, CTB, CSO or SNOW noise will be sufficient for that particular impairment to stabilize (converge) which will normally require the processing and the accumulation of data from at least X=100 preferably, at least X=150 and most preferably at least X=200 quiet lines, i.e. 200 lines will be grabbed as indicated at 10 and processed as indicated at 15 or more preferably at 14 (as will be described hereinbelow and the value for CTB, CSO and SNOW noise for each quiet line will be obtained. These values will then be accumulated in their respective accumulator 16, 18 and 20 until the values for the required X lines have been accumulated.

The accumulated noise values for each impairment will then be averaged for the N number of lines processed to provide a reading of the amount of the impairment contained in the signal. If desired the carrier to noise (C/N) ratio may then be determined for each impairment. For example the CTB noise accumulated at 16 will be averaged to determine the CTB impairment and may be presented as an amount or preferably as a ratio, the carrier to noise ratio C/N ratio for that particular impairment. The CTB, CSO and/or SNOW C/N ratios are determined as indicated at 22, 26 and 28 respectively and each is reported, recorded and/or displayed as indicated at 24.

Figure 2:
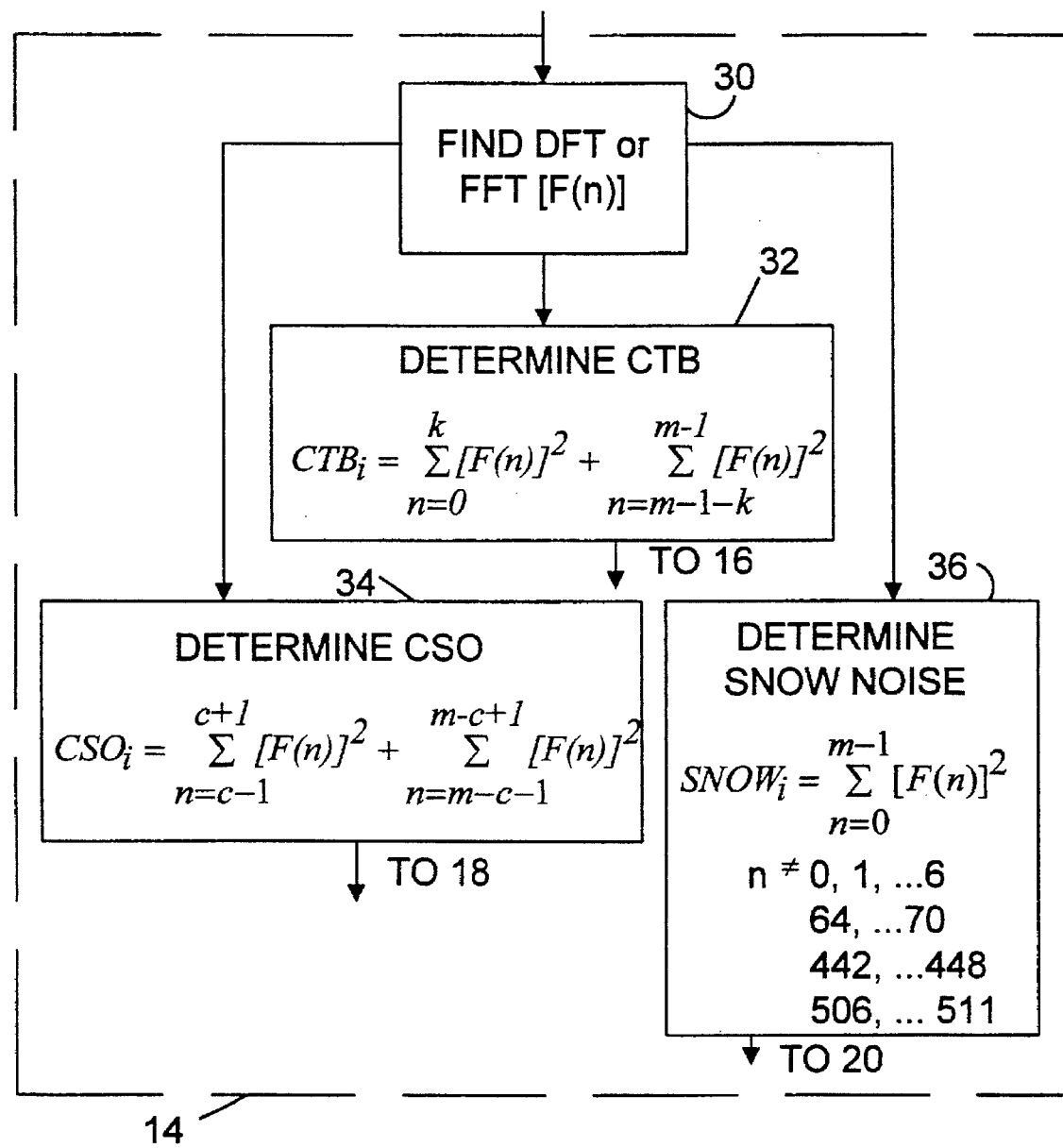
FIG. 2 is a flow diagram showing in greater detail the processing of the digitized signal.

The processing stage 14 is shown in more detail within the dot dash lines in FIG. 2. In the preferred embodiment the Fourier transform of the digitized quiet line, preferably a fast Fourier transform (FFT) or the discrete Fourier transform (DFT) designated by the symbol F(n), is determined for the digitized quiet line from 12 in a first stage 30. Next the desired impairment which may be CTB, CSO and/or SNOW noise is determined as indicated at 32, 34 and 36 respectively.

A given quiet line is digitized for example to provide 512 points (n) (i.e. n=0, 1, 2, . . . 511), and the discrete Fourier transform for the quiet line is designated by the symbol F(n) as indicated at 30 in FIG. 2 and represents the frequency spectrum contained along the length of the quiet line.

The CTB (indicated by block 32) for the quiet line is preferably determined by the formula $$CTB_i = \sum_{n=0}^{k} [F(n)]^2 + \sum_{n=m-1-k}^{m-1} [F(n)]^2 \quad (1)$$

where

F(n) is the n point in the DFT or FFT of the digitized quiet line signal having m number of points, k is equivalent to the frequency range in which the CTB impairment is found in the Fourier transform of the digitized signal, when the transform is digitized into 512 points as above described formula 1 becomes $$CTB_i = \sum_{n=0}^{k} [F(n)]^2 + \sum_{n=511-k}^{511} [F(n)]^2 \quad (1A)$$

where k=0, or 1, or 2, or 3, or 4, or 5, or 6.

The section of the fast Fourier transform represented by n=0 to n=6, corresponds essentially to the carrier frequency plus ±15 Khz and the section of the Fourier transform n=506 to n=511 corresponds with the carrier frequency −15 Khz.

The resultant CTB for that particular line is then fed to the accumulator 16 where the values for CTB is accumulated for a number (N) of quiet lines preferably each taken from a different frame. The number of quiet lines N will normally be at least 100 preferably at least 150 quiet lines and most preferably at least 200 quiet lines.

$$\text{The average CTB energy per line} = \frac{1}{N} \sum_{i=1}^{N} CTB_i$$

The CSO as indicated by the box 34 is preferably determined using the formula, $$CSO_i = \sum_{n=c-l}^{c+l} [F(n)]^2 + \sum_{n=m-c-l}^{m-c+l} [F(n)]^2 \quad (2)$$

where

F(n) is the n point in the DFT or FFT of the digitized quiet line signal having m number of points, c is the centre frequency of the CSO impairment frequency range on the Fourier transform of the digitized signal, l is equivalent to ½ of the CSO impairment frequency on the Fourier transform of the digitized signal, and when said Fourier transform of said digitized signal is divided into 512 points per line, and l may be 0, 1, 2, or 3.

The digitized points n=64 to 70 correspond the CSO impairment frequency range which is normally between 1250±15 Khz, from the visual carrier. If the CSO impairment frequency range was different as it sometimes is for example it is sometimes found between 2500±15 Khz from the visual carrier and the selected range for n will be changed accordingly.

SNOW noise is preferably determined as indicated at 36 using the formula, $$SNOW_i = \sum_{n=0}^{m-1} [F(n)]^2 \quad (3)$$

where n≠0, . . . k, nor c−l, . . . c+l, nor m−c−l . . . m−c+l, nor m−l−k . . . m−1.

where

F(n) is the n point in the DFT or FFT of the digitized quiet line signal having m number of points, l is equivalent to ½ of the CSO impairment frequency range on the Fourier transform in the digitized signal, k is equivalent to the frequency range in which the CTB impairment is found in the Fourier transform of the digitized signal, when said Fourier transform of said digitized signal is divided into 512 points per quiet line l may be 0, 1, 2, or 3.

It is also preferred to remove the digitized frequency range of the audio signal from the signal considered for defining SNOW noise i.e. n≠frequency range of the audio signal.

Specifically when there are 512 points per line and the CTB and CSO noises are located as above described (CSO 64 to 70 and 442 to 448) and at equation 3 becomes $$SNOW_i = \sum_{n=0}^{511} [F(n)]^2 \quad (3A)$$

where n≠0, 1 . . . 5

64, . . . 70

442, . . . 448

507, . . . 511

Each of these determined impairments, if they are to be further analyzed, are averaged for each accumulation of values based on N lines as indicated at 16, 18 and 20.

The average CTB energy for per quiet line, is given by the formula $$CTB/\text{line} = \frac{1}{N} \sum_{i=1}^{N} CTB_i \quad (4)$$

The average CSO energy for per quiet line, is given by the formula $$CSO/\text{line} = \frac{1}{N} \sum_{i=1}^{N} CSO_i \quad (5)$$

The average SNOW energy for per quiet line, is given by the formula $$SNOW/\text{line} = \frac{1}{N} \sum_{i=1}^{N} SNOW_i \quad (6)$$

These averages are then fed to the respective processes for determining the respective C/N ratios as indicated at 22, 26 or 28.

The carrier to noise ratio is as determined as follows:

The carrier level is designated as S and a line is formed l(n), n=0, 1, 2, . . . 511, where l(n)=S. The fast Fourier transfer (FFT) of l(n) is found designated L(n) and the value is stored as L(0). The carrier to noise C/N ratio for the CTB, CSO and SNOW are then found as follows:

$$CTB = 10 \log \frac{[L(0)]^2}{\frac{1}{N} \sum_{i=1}^{N} CTB_i} \quad (7)$$

$$CSO = 10 \log \frac{[L(0)]^2}{\frac{1}{N} \sum_{i=1}^{N} CSO_i} \quad (8)$$

$$SNOW = 10 \log \frac{[L(0)]^2}{\frac{1}{N} \sum_{i=1}^{N} SNOW_i} \quad (9)$$

These resultant carrier to noise ratios for CTB, CSO and SNOW are then reported as desired via the display or the like 24 which may be an optical, digital or a printout of the result. It is apparent that if desired the signal to noise ratio may be determined in a similar manner if desired.

If only CTB and SNOW noises are present the impairments may be measure directly from the quiet line without the Fourier transform for example by simply performing a running average along the quiet line i.e. if the digitized form of the quiet line is represented by Q(n), n=0, 1, .... 511, each point Q(n) is replaced by Step 1. Performing a running average over the quiet line, and replace each point Q(n) by $\widehat{Q}(n)$ where $$\widehat{Q}(n) = \frac{1}{2M+1} \sum_{i=-M}^{M} Q(n-i) \quad (10)$$

where M=1, 2 or 3 preferably 2

Step 2. Repeat Step 1 a selected number of times for example ten times.

Step 3. For each quiet line obtain $$CTB_i = \sum_{n=0}^{511} [\widehat{Q}(n)]^2 \quad (11)$$

Step 4. For each quiet line obtain $$SNOW_i = \sum_{n=0}^{511} [Q(n) - \overline{Q}(n)]^2 \quad (12)$$

Step 5. Obtain a value for CTB based on the average of $CTB_i$ values for a plurality of at least 100 quiet lines.

Step 6. Obtain a value for SNOW based on the average $SNOW_i$ values for a plurality of at least 100 quiet lines.

EXAMPLES

Figure 3:
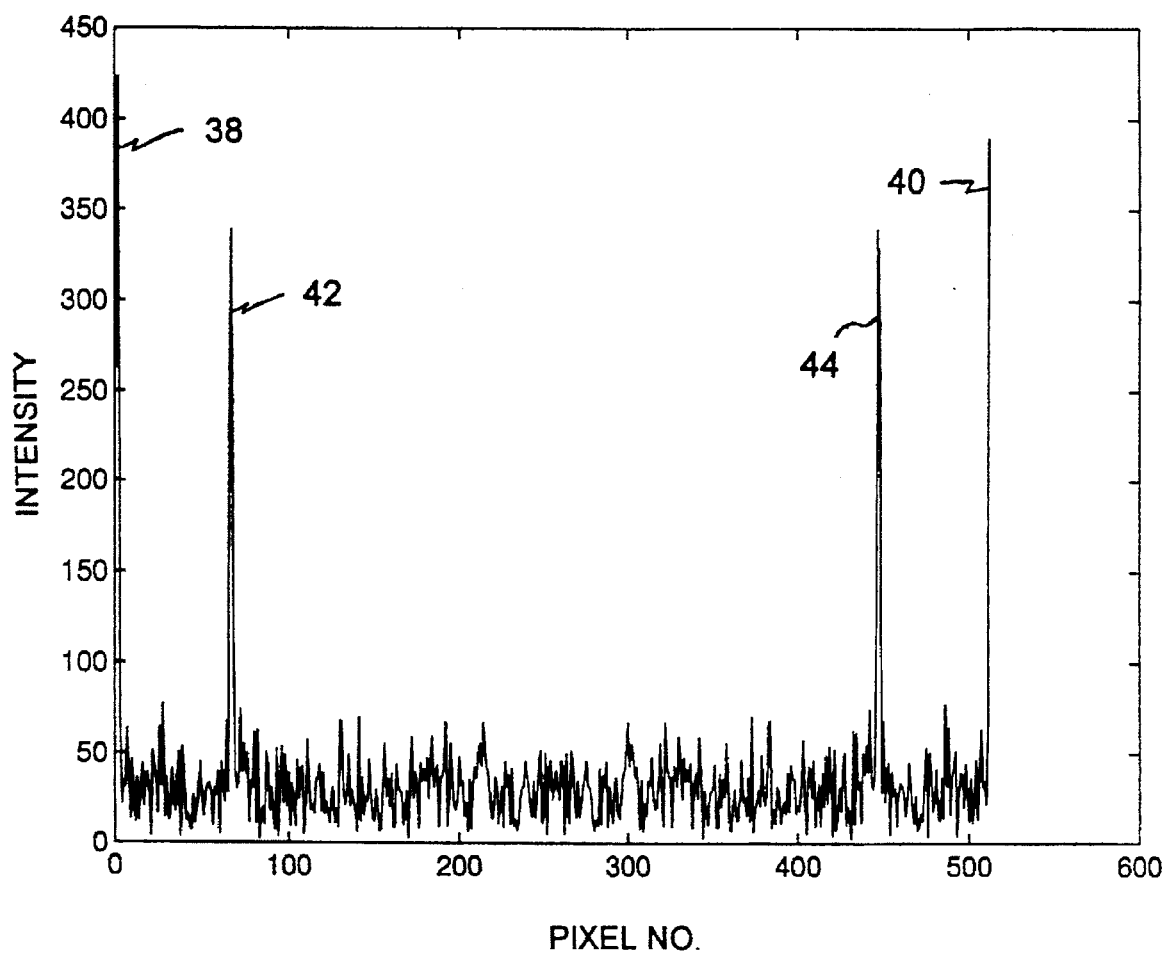
FIG. 3 is a typical digitized signal of intensity versus point or position number.

FIG. 3 is a typical digitized quiet line showing the CTB at the extremities of the line as indicated by the peaks 38 and 40 while CSO is indicated by the peaks 42 and 44 and the SNOW noise extends substantially the full length of the digitized line. However, for the purposes of the present invention, those portions of the line used to determine the CTB and CSO are eliminated from the calculation of SNOW noise.

Figure 4:
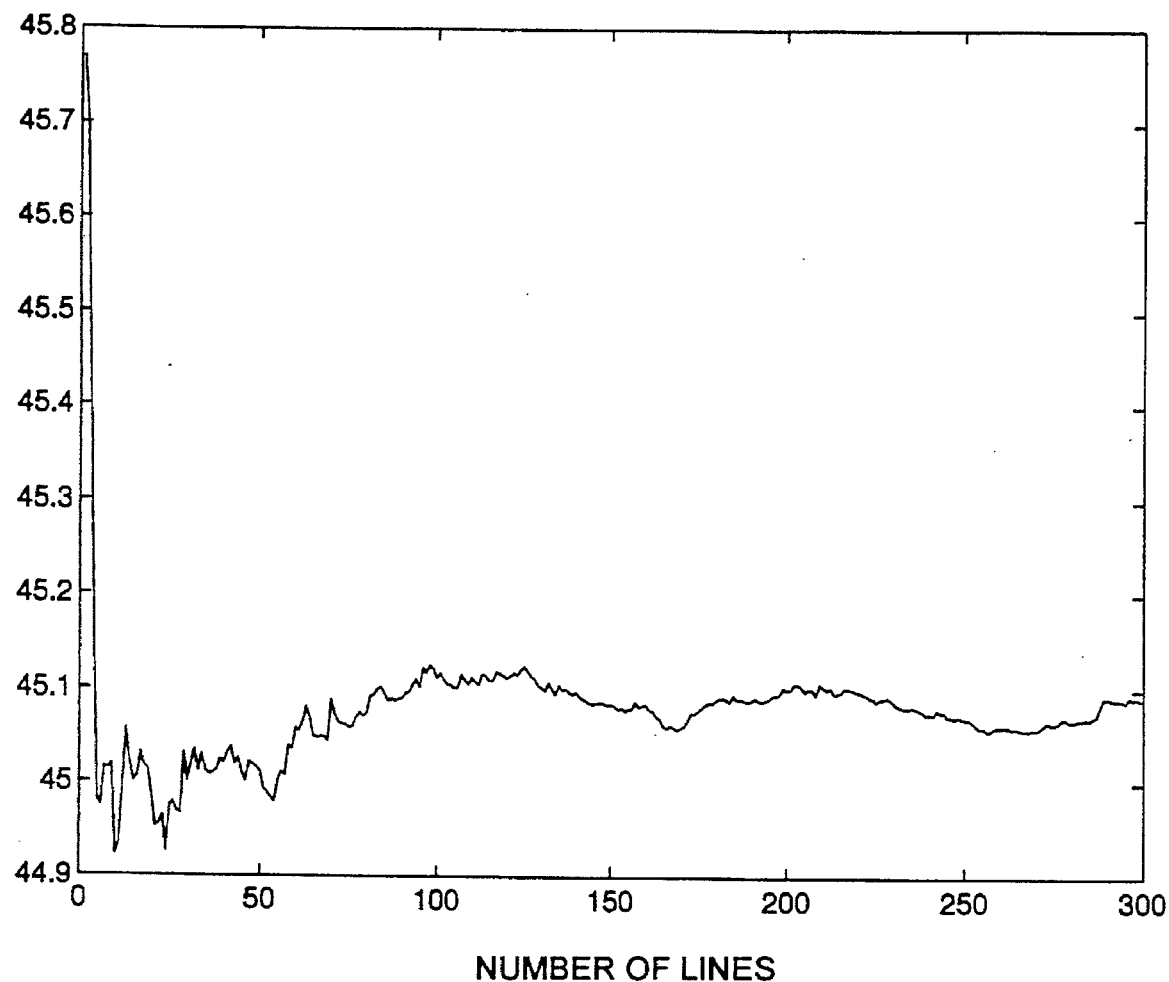
FIG. 4 is a typical plot of averages for the CTB signal indicating the convergence of the CTB signal to an accurate indication of the intensity of CTB.
Figure 5:
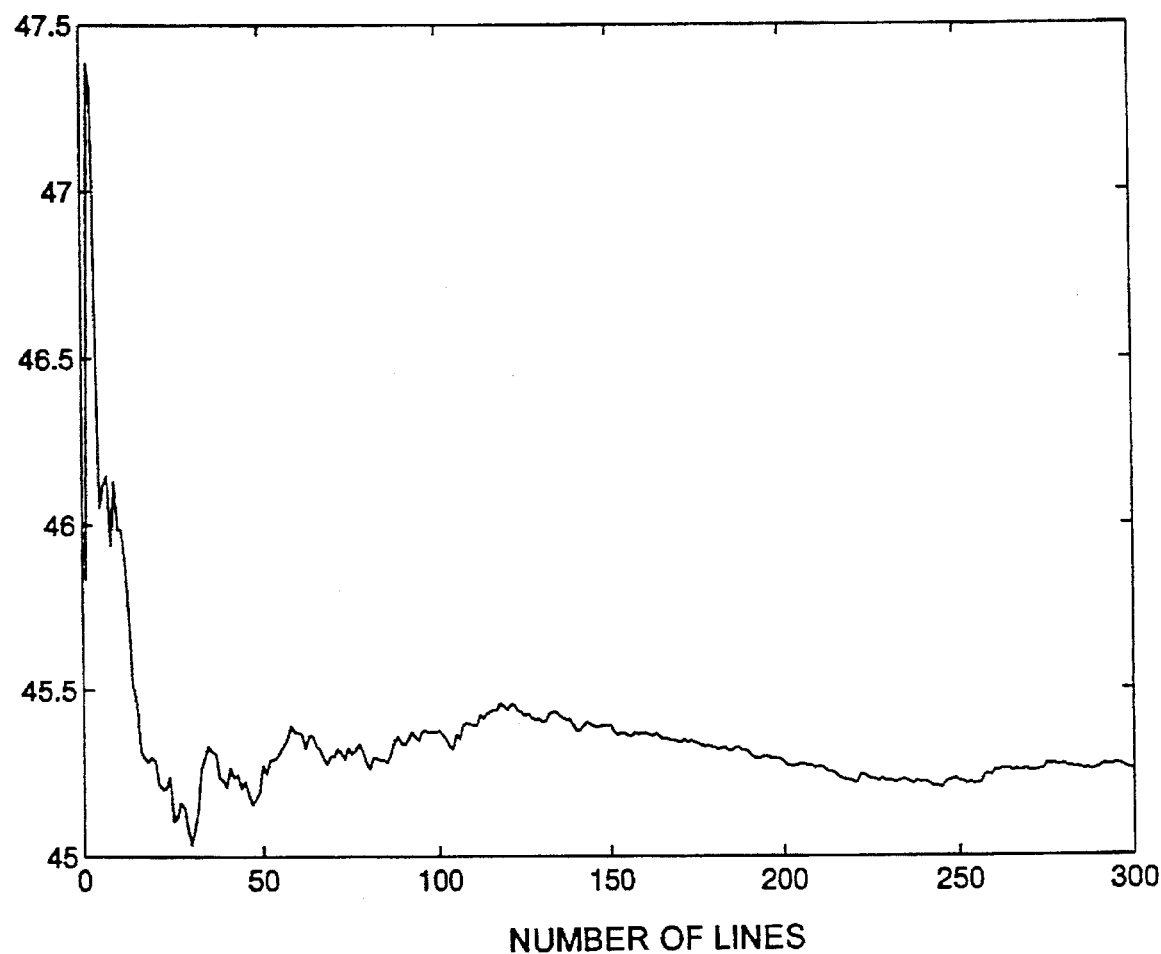
FIG. 5 is a plot similar to FIG. 4 but illustrating the value of the CSO impairment.
Figure 6:
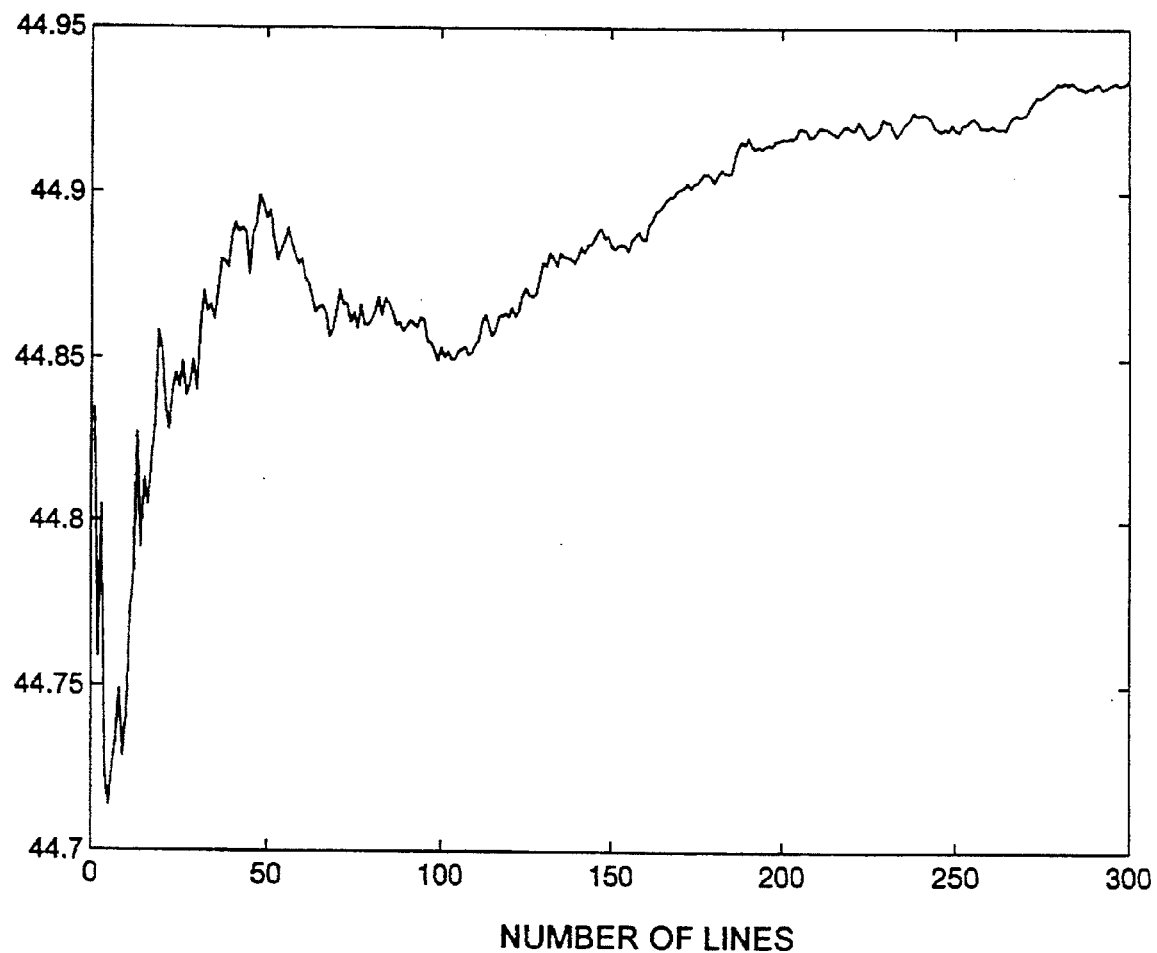
FIG. 6 is a similar plot for SNOW noise.

FIGS. 4, 5 and 6 show results obtained by processing numbers of quiet lines from N=0 to N=500 showing the convergent of the results for CTB, CSO and SNOW noises respectively to the true reading of the values for these results.

It is apparent that with less than about 100 lines, the accuracy of the determination may be impaired and thus, it is preferred to use at least 150 and preferably over 200 lines particularly when CTB is being defined. With CSO, 100 lines is adequate. However, with SNOW noise, convergence seems to occur after about 200 quiet lines have been processed for the experiment conducted and illustrated in FIG. 6.

Having described the invention, modifications will be evident to those skilled in the art without departing from the scope of the invention as defined in the appended claims.

I claim:

1. A non-intrusive method of determining signal impairments of a TV signal of a plurality of video frames containing quiet lines comprising providing a quiet line signal of one of said quiet lines, processing said quiet line signal to segregate at least one noise impairment selected from the group consisting of CTB, CSO and SNOW noise impairments to provide a value for said at least one of said CTB, CSO and SNOW noise impairments, repeating said providing and processing for a significant number X of said quiet lines, said number X of quiet lines being sufficient to obtain a meaningful reading of the amount of said at least one impairment and providing said meaningful reading.

2. A method as defined in claim 1 wherein said providing said meaningful reading includes averaging said value for said at least one impairment for said number X of quiet lines.

3. A method as defined in claim 1 wherein an effect of a visual carrier for said TV signal is subtracted from each said quiet line signal to remove the visual carrier effect prior to said processing to find said value of said at least one of said CTB, CSO or SNOW impairments.

4. A method as defined in claim 2 wherein an effect of a visual carrier for said TV signal is subtracted from each said quiet line signal to remove the visual carrier effect prior to said processing to find said value of said at least one of said CTB, CSO or SNOW impairments.

5. A method as defined in claim 1 wherein said processing comprises filtering said quiet line signal.

6. A method as defined in claim 2 wherein said processing comprises filtering said quiet line signal.

7. A method as defined in claim 6 wherein said selected impairment is CTB and is determined by a summation of the energy of said significant number X of quiet lines in a±15 Khz range of said TV signal.

8. A method as defined in claim 6 wherein said selected impairment is CSO and is determined by a summation of the energy of said significant number X of quiet lines in a frequency range wherein said CSO impairment has a dominant influence.

9. A method as defined in claim 1 wherein each said quiet line signal is digitized to provide a digitized signal of said quiet line and said processing initially performs a Fourier transform of said digitized signal before segregating said at least one selected impairment.

10. A method as defined in claim 9 wherein said at least one selected impairment is CTB and is determined by an average of energies of said significant number X of quiet lines in the ±15 Khz range of said TV signal.

11. A method as defined in claim 9 wherein said at least one selected impairment is CSO and is determined by an average of energies of said significant number X of quiet lines in a the frequency range wherein said CSO impairment has a dominant influence.

12. A method as defined in claim 9 wherein said at least one selected impairment is CTB and is determined based on the formula $$CTB_i = \sum_{n=0}^{k} [F(n)]^2 + \sum_{n=m-1-k}^{m-1} [F(n)]^2 \quad (1)$$

where

F(n) is the n point in the Fourier transform of a digitized quiet line signal having m number of points, k is equivalent to a frequency range in which the CTB impairment is found in said Fourier transform of said digitized signal.

13. A method as defined in claim 9 wherein said at least one selected impairment is CSO and is determined based on the formula $$CSO_i = \sum_{n=c-l}^{c+l} [F(n)]^2 + \sum_{n=m-c-l}^{m-c+l} [F(n)]^2 \quad (2)$$

where

F(n) is the n point in the Fourier transform of a digitized quiet line signal having m number of points, c is the center frequency of a CSO frequency range on said Fourier transform of said digitized signal, l is equivalent to ½ of the CSO frequency range in said Fourier transform of said digitized signal.

14. A method as defined in claim 9 wherein said at least one selected impairment is SNOW and is determined based on the formula $$SNOW_i = \sum_{n=0}^{m-1} [F(n)]^2 \quad (3)$$

where n≠0, . . . k, nor $c-l_i$. . . c+l, nor m−c−l . . . m−c+l, nor m−1−k . . . m−1, where F(n) is the n point in the Fourier transform of a digitized quiet line signal having m number of points, c is the center frequency of a CSO impairment frequency range in said Fourier transform of said digitized signal, l is equivalent to ½ of the CSO impairment frequency range in said Fourier transform of said digitized signal, k is equivalent to a frequency range in which the CTB impairment is found in said Fourier transform of said digitized signal.

15. A method as defined in claim 4 wherein each said quiet line signal is digitized to provide a digitized signal of said quiet line and said processing initially performs a Fourier transform of said digitized signal before segregating said at least one selected impairment.

16. A method as defined in claim 15 wherein said at least one selected impairment is CTB and is determined by an average of energies of said significant number X of quiet lines in the ±15 Khz range of said TV signal.

17. A method as defined in claim 15 wherein said at least one selected impairment is CSO and is determined by an average of energies of said significant number X of quiet lines in a frequency range wherein said CSO impairment has a dominant influence.

18. A method as defined in claim 15 wherein said at least one selected impairment is CTB and is determined based on the formula $$CTB_i = \sum_{n=0}^{k} [F(n)]^2 + \sum_{n=m-1-k}^{m-1} [F(n)]^2 \quad (1)$$

where

F(n) is the n point in a Fourier transform of a digitized quiet line signal having m number of points, k is equivalent to a frequency range in which the CTB impairment is found, in said Fourier transform of said digitized signal.

19. A method as defined in claim 15 wherein said at least one selected impairment is CSO and is determined based on the formula $$CSO_i = \sum_{n=c-l}^{c+l} [F(n)]^2 + \sum_{n=m-c-l}^{m-c+l} [F(n)]^2 \quad (2)$$

where

F(n) is the n point in the Fourier transform DFT or FFT of digitized quiet line signal having m number of points, c is the center frequency of a CSO frequency range on said Fourier transform of said digitized signal, l is equivalent to ½ of the CSO frequency range in said Fourier transform of said digitized signal.

20. A method as defined in claim 15 wherein said at least one selected impairment is SNOW and is determined based on the formula $$SNOW_i = \sum_{n=0}^{m-1} [F(n)]^2 \quad (3)$$

where $n \neq 0, \ldots, k$, nor $c-l_i \ldots c+l$, nor $m-c-1 \ldots m-c+1$, nor $m-1-k \ldots m-1$, where F(n) is the n point in the Fourier transform of a digitized quiet line signal having m number of points, c is the center frequency of a CSO impairment frequency range on said Fourier transform of said digitized signal, l is equivalent to ½ of the CSO impairment frequency range in said Fourier transform of said digitized signal, k is equivalent to frequency range in which the CTB impairment is found in said digitized signal.

* * * * *